Oct. 16, 1962     T. A. BYLES     3,059,167

REGULATOR CIRCUIT FOR GENERATORS

Original Filed Dec. 23, 1957

INVENTOR.
Theodore A Byles

BY Mueller & Aichele

Attys.

3,059,167
REGULATOR CIRCUIT FOR GENERATORS
Theodore A. Byles, Villa Park, Ill., assignor to Motorola, Inc., Chicago, Ill., a corporation of Illinois
Continuation of application Ser. No. 704,421, Dec. 23, 1957. This application Apr. 28, 1961, Ser. No. 115,590
20 Claims. (Cl. 322—25)

This invention relates to voltage and current regulators and more particularly to an electronic regulator of the type adapted to control the current and voltage of a generator in a vehicular electrical system. The present application is a continuation of my application Serial No. 704,421, filed December 23, 1957, now abandoned.

The present day regulator used in vehicles, such as automobiles, commonly employs electromechanical means to limit the current to a value which the generator can safely supply and to limit the voltage output of the generator to a value which will not damage the various devices connected to the system in the automobile. In this way, the storage battery usually included in electrical systems of this type can be charged and, for the most part, supplanted when the generator output is sufficient to energize various electrical items in the vehicle. Such prior art regulators have been troublesome in that calibration thereof may be unstable and the mechanically operated electrical contacts can fail to operate reliably under the varying conditions which are encountered during use of the vehicle. The electronic regulators known in the past have not been altogether suitable for the use in a vehicle electrical system where stability requirements are severe and the temperature operating ranges are great.

Accordingly, it is an object of this invention to provide an electronic voltage regulator for an automobile electrical system which has improved stability and reliability over previously known regulators.

Another object is to provide an improved transistorized regulator for an automobile generator for charging the battery in the electrical system, which regulator requires no moving parts for limiting the current drawn from the generator to prevent overload thereof and for limiting the voltage output of the generator to prevent application of excess potentials to the automobile electrical accessories.

Another object of the invention is to provide a temperature responsive electronic regulator for an automobile electrical system in which the regulated voltage level is increased at lower temperatures in order to meet the charging requirements of a lead acid storage battery.

Still another object of the invention is to provide a transistorized voltage and current regulator which is temperature compensated in order to overcome temperature sensitivity of present day transistors, the effects of which may adversely influence regulator operation as it is used in an automobile under variable ambient temperature conditions.

A feature of the invention is the provision of transistor circuits which are responsive to current and voltage changes and which are adapted to variably energize a control winding of a generator system with a novel biasing arrangement for the transistors to reduce the output of the generator system when particular output current or voltage is developed.

Another feature is the provision of a voltage divider network for biasing a current controlled transistor in a regulator which includes a ballast tube and load current carrying resistor means for rendering the transistor responsive to load current change but unresponsive to load voltage change.

Another feature is the provision of such a voltage divider network for biasing a current sensitive control transistor in a regulator wherein the temperature sensitivity of the transistor is compensated by a negative temperature coefficient resistor to minimize adverse effects of the temperature change on the regulated value of the current.

A further feature of the invention is the provision of a biasing network for a voltage responsive transistor in a regulator wherein a negative temperature coefficient resistor establishes a higher regulated output voltage at low temperatures than is established at higher temperatures in order to optimize the charging voltage for a storage battery.

A still further feature of the invention is the provision of a regulator for an automobile battery charging generator wherein reverse current flow, or battery discharge, into the regulator is controlled by a power diode. The diode may also be used in a simple and inexpensive charging system for the battery.

Further objects, features and the attending advantages of the invention will be apparent upon consideration of the following description when taken in conjunction with the accompanying drawings, in which.

In a particular form of the invention, a control transistor is adapted to be coupled to a control winding of a generator system for regulating the generator system output. The conduction of the control transistor is regulated by a transistor responsive to a certain voltage change and a transistor responsive to a certain current change. Control elements of the voltage responsive transistor are coupled to a voltage divider network connected to the output of the generator system and including a zener diode and a negative temperature coefficient resistor so that the voltage responsive transistor conducts when a given generator voltage is reached, corresponding to a breakdown potential of the zener diode, to decrease the conduction of the control transistor and limit the output voltage of the generator system. The negative temperature coefficient resistor causes the effective control voltage limit to increase at low temperatures thus providing a higher charging voltage for a lead acid storage battery at low temperatures. The voltage divider may include a ballast tube so that the control voltage limit is less sensitive to the voltage of the generator system. Control elements of the current responsive transistor are coupled to a voltage divider network having a further negative temperature coefficient resistor and a constant reference potential established by a ballast tube. The current responsive transistor is also controlled by a potential varying with load current so that sufficient increase of the current causes conduction of the current responsive transistor and decreased conduction of the control transistor, and thus the control winding current, to reduce generator system output. The negative temperature coefficient resistor is placed in the voltage divider network to compensate for a change in the conduction characteristics of the current responsive transistor during a change in ambient temperature. A power diode may be used at the output of the regulator circuit to prevent reverse current flow from the battery load into the generator system and a switch and transformer circuit may be included with the diode circuit to provide a simple means of charging the storage battery from the household power lines through the power diode.

Figure 1:
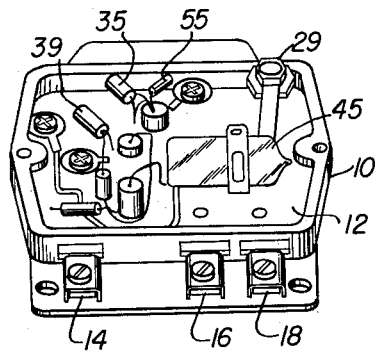
FIG. 1 is a perspective top view of a regulator with the cover removed and constructed in accordance with the present invention.
Figure 2:
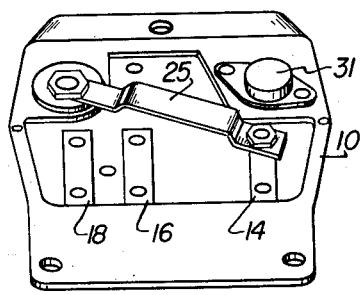
FIG. 2 is a perspective bottom view of the regulator of FIG. 1.
Figure 3:
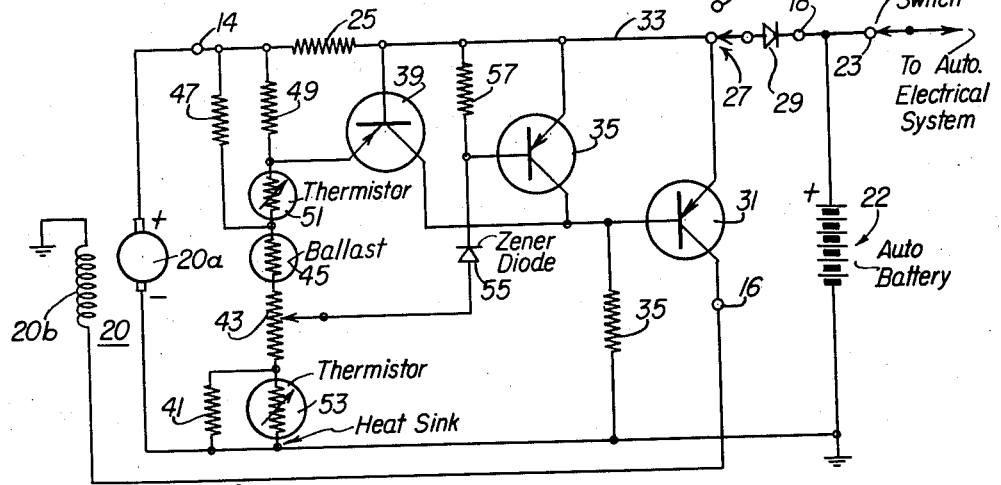
FIG. 3 is a schematic diagram of the regulator constructed in accordance with the invention.

The voltage and current regualtor shown in FIGS. 1 and 2 includes a housing frame 10 supporting a printed circuit panel 12 which carries some of the circuit components identified in connection with the explanation of the circuit of FIG. 3. A suitable enclosing cover (not shown)

may be secured to the frame 10 to enclose the components shown in FIG. 1. The components exposed from the bottom of frame 10 as shown in FIG. 2 are protected when the unit is mounted against a surface in the engine compartment of an automobile or other vehicle in which the device is used. Electrical connection to the device is made through the frame 10 which is a reference point or ground for the device and terminals 14, 16 and 18 which are respectively connected to the generator system output, or armature; the generator system control winding, or field; and the load to which the generator supplies power, or the battery which is charged by the generator system.

In the schematic diagram of FIG. 3 there is shown a direct current automobile generator 20, the armature 20a of which has a positive terminal connected to the terminal 14 and a negative terminal connected to ground, or the frame of the regulator. A field winding 20b of the generator is connected between ground and terminal 16 of the regulator. The output terminal 18 of the regulator is connected to the positive terminal of an automobile storage battery 22 and also through ignition switch 23 of the automobile electrical system. A negative terminal of battery 22 is grounded. Current is supplied from the generator 20 to charge the battery 22 or to energize the auto electrical system by conduction from terminal 14 through resistor 25, switch 27, which is normally closed, and diode 29 and terminal 18. Diode 29 is poled to prevent reverse conduction or discharge of the battery 22 into the regulator and generator system. The return current path is, of course, provided through ground.

In the regulator circuit, a power transistor 31 has its emitter connected to lead 33 which extends between resistor 25 and a terminal of switch 27. The base electrode of transistor 31 is connected to ground through resistor 35. The output electrode, or collector, of transistor 31 is connected to terminal 16 and the field 20b of the generator is series connected in the emitter-collector circuit of the transistor so that a change in the transistor output current will vary the energization of the field winding and thus control the output of the generator.

Transistor 35 is connected so that it will be conductive when a predetermined voltage limit is reached and when the generator system output voltage exceeds such limit, transistor 35 conducts to control transistor 31 in a way to reduce the field current to limit the generator output voltage. Transistor 39 is sensitive to the generator system output current conducted through lead 33 and between terminals 14 and 18, so that an increase beyond a given current level will cause a reduction in the output current of transistor 31 and thereby a reduction of the output of generator 20. The circuit construction and operation to accomplish these results will now be explained.

To provide the necessary biasing voltages for transistors 35 and 39, a voltage divider network is connected between terminal 14 and ground, with a further portion of the network being connected to lead 33. The network includes a resistor 41 connected between ground and one fixed terminal of a variable resistor 43, the other fixed terminal of resistor 43 being connected to a ballast tube 45. The ballast tube 45 is series connected with resistor 47 which is connected to terminal 14. A series combination of resistor 49 and thermistor 51 is connected across resistor 47 and a further thermistor 53 is connected across resistor 41. The movable arm of variable resistor 43 is connected to a zener or avalanche type diode 55 which is series connected with resistor 57 to lead 33.

The ballast tube 45 is used to maintain a constant current in its series circuit throughout a variation of the generator system output voltage over which the regulator operates. Accordingly, reference potentials are available in the voltage divider system which are independent of variations in the supply voltage existing between terminal 14 and ground.

Transistor 35 is connected in a voltage limit responsive network with its emitter connected to lead 33, its base connected to the junction of diode 55 and resistor 57 and its collector connected to the base of transistor 31. Variable resistor 43 is adjusted to provide a bias on diode 55 such that this diode will reach its critical back bias voltage, or reverse breakdown voltage, when the voltage between lead 33 and ground has reached a predetermined maximum at which it is desired to limit the output of the system. At potentials of lead 33 below the desired maximum allowable voltage transistor 35 is biased to cutoff and when the maximum voltage is exceeded the diode 55 commences conduction in a reverse direction and the current flowing through resistor 57 establishes a bias on transistor 35 such that it conducts through resistor 35 thereby reducing the conduction of transistor 31 and reducing the energizing current in field winding 20b so that the generator output is reduced. The system then maintains a balance with a small control voltage existing across resistor 57.

It may be noted that if the collector current of transistor 35 tends to rise due to junction heating, this would cause a reduction in the generator output voltage thereby reducing the emitter bias on transistor 35 until equilibrium was reached. Accordingly, the voltage limiter circuit is self-compensating for temperature effects on the transistor 35.

In a particular application of the regulator it may be desirable to raise the maximum limit voltage of the system at lower temperatures. For example, in a nominal 14 volt automobile electrical system, it may be desired that the maximum allowable voltage output be 14 volts at temperatures in the neighborhood of 150° F. and a voltage of 15.8 in the region nearer 0° F. This is in accordance with the optimum charging voltages for some lead acid storage batteries used in automobiles. Thermistor 53 in parallel with resistor 41 is used to provide this effect. Thermistor 53 has a negative temperature coefficient so that at higher temperatures the voltage applied from the arm of variable resistor 43 to the zener diode is somewhat lower than it is at low temperatures. This temperature control voltage is effectively a bias which adds to the breakdown voltage of diode 55. Accordingly, the limiting voltage at which transistor 35 commences conduction is higher as temperature decreases and the regulator circuit therefor compensates for the internal resistance of the storage battery as it varies with temperature. It may also be noted that it is desirable to connect the ground side of thermistor 53 by means of an effective heat conductor contact with the frame of the regulator unit to prevent a runaway condition because as thermistor 53 is heated through self-generated heat, this would otherwise have the tendency to increase the current through this thermistor and continue the heating process.

The current limiter transistor 39 has a base electrode connected to lead 33, and a collector electrode connected to the base of transistor 31 and an emitter electrode connected to the junction of thermistor 51 and resistor 49. Accordingly, transistor 39 is biased by the voltage across the combination of resistors 25 and 49. As previously explained, ballast tube 45 maintains an essentially constant current through the voltage divider network so that the potential drop across resistor 49 does not vary with variation in the output voltage of generator 20. The components in the biasing voltage divider network, including resistor 47, resistor 49 and thermistor 51, together with resistor 25, provide a reverse emitter bias for transistor 39 so that it is biased below cutoff. However, the value of resistor 25 is selected so that as a predetermined current level is reached a potential drop is produced which causes conduction of transistor 39 through resistor 35 thereby controlling the power transistor 31 to cause the reduction in the current through field 20b and thus a reduction in the output of generator 20.

Transistor 39 may also be temperate sensitive and for any given desired conduction condition of this transistor the necessary bias may be a function of the temperature of the transistor. Accordingly, thermistor 51, having a negative temperature coefficient, in combination with resistor 49, which has a very small value compared to that of thermistor 51, provides a bias voltage for the emitter of transistor 39 which is a function of temperature to compensate for the change in conduction characteristics of the transistor.

In particular applications of the electronic current and voltage limiter of the present invention it may be desired that the regulated voltage be higher when the limiter commences operation than it is after 15 to 30 minutes of operation. It has been found that warm-up heating of the device in combination with the temperature compensating circuit elements described above are sufficient to cause a small decrease in the voltage at which limiter action takes place thus providing this desirable characteristic of the regulator system.

In a particular successful embodiment of the invention the circuit constants were as follows:

| | |
|---|---|
| Transistor 31 | 2N176. |
| Transistors 35, 39 | XN13. |
| Resistor 25 | .008 ohm. |
| Resistor 35 | 220 ohms. |
| Resistor 41 | 12 ohms. |
| Resistor 43 | 25 ohms. |
| Ballast tube 45 | DT–583. |
| Resistor 47 | 3.3 ohms. |
| Resistor 49 | 1 ohm. |
| Thermistors 51, 53 | 40 ohms at 25° C. |
| Diode 55 | ZA12 (Hoffman Electronics). |
| Battery 22 | Nominally 12 volts. |

With the particular circuit constructed according to these specifications, current limiting could be successfully maintained at 30 amperes and voltage limiting could be maintained at 15.8 volts at 0° F. and at 14.5 volts at 150° F.

As a further refinement of the circuit, switch 27 includes a contact 60 so that operation of the switch to establish contact 60 will connect the secondary of transformer 65 between the diode 29 and ground. The primary of transformer 65 may include a standard line cord plug 67 so that transformer 65 can supply the proper voltage from the power lines for rectification by diode 29 and charging of battery 22. Obviously other methods of connecting transformer 65 to the system may be employed. In this way, it is possible to use the cutout diode 29 as part of a simple battery charging circuit when a power outlet is available.

Accordingly, this invention provides a regulator suitable for use in a vehicle electrical system wherein a generator supplies charging power for a storage battery used in the system. The current and voltage limiter action of the system described provides change in output characteristics with temperature as may be required by a storage battery and successfully maintains desired limit voltage and current values during variation in the ambient temperature of the regulator unit thereby compensating for changes in the characteristics of the components used in the system.

I claim:

1. A voltage regulator circuit including in combination a power circuit adapted to be energized with respect to a reference point by an electrical source to be regulated, an output control circuit including control means coupled to said power circuit and responsive to a control potential for regulating the output voltage of the electrical power source, a voltage reference circuit including a temperature sensitive resistor, a zener diode and a further resistor series connected in the order named between the reference point and said power circuit, a transistor having input electrodes coupled across said further resistor, said transistor further having an output electrode coupled to said control means, the constants of said voltage reference circuit being selected to provide changed conduction of said transistor with the output voltage of the power source above a predetermined value for application of the control potential to said control means, and said temperature sensitive resistor having a temperature coefficient for biasing said zener diode and causing the changed conduction of said transistor at higher output voltages as the ambient temperature decreases.

2. A voltage regulator circuit including in combination a power circuit adapted to be energized with respect to a reference point by an electrical source to be regulated, an output control circuit including control means coupled to said power circuit and responsive to a control potential for regulating the output voltage of the electrical power source, a voltage divider including a temperature sensitive resistor coupled between the reference point and said power circuit, a zener diode and a resistor series coupled in the order named between said voltage divider and said power circuit, a transistor having input electrodes coupled across said resistor, said transistor further having an output electrode coupled to said control means, said zener diode and said resistor being selected to provide changed conduction of said transistor with the output voltage of the power source above a predetermined value for application of the control potential to said control means, and said temperature sensitive resistor having a temperature coefficient for biasing said zener diode to cause the changed conduction of said transistor at higher output voltages as the ambient temperature decreases.

3. A voltage regulator for a vehicular electrical system having an electromechanical source of direct current with a field winding therein and a load circuit including a chargeable battery, said regulator including in combination, a first conductor to be energized by the source of direct current, a first terminal for connection to the battery, switch means for selectively connecting said first conductor to said first terminal, a second terminal for connection to the field winding, frame means providing an electrical reference conductor and forming a heat sink for said regulator, an insulated panel supported by said frame means for carrying the interconnected components of said regulator, a first PNP transistor mounted on said frame means and having a base electrode and further having an emitter electrode connected to said first conductor and a collector electrode connected to said second terminal, a second PNP transistor having an emitter electrode connected to said first conductor and a collector electrode connected to said base of said first transistor and further having a base electrode, first through fourth resistor means supported on said panel, means connecting said first resistor means between said base electrode of said first transistor and said reference conductor, means connecting said second and third resistor means in series in the order named between said reference conductor and said first conductor, a zener diode supported by said panel, means connecting said zener diode between the interconnection of said second and third resistor means and said base electrode of said second transistor, means connecting said fourth resistor means between said base electrode of said second transistor and said first conductor, and a thermistor connected across at least a portion of said second resistor means.

4. A voltage regulator circuit including in combination an input circuit adapted to be energized with respect to a reference point by an electrical power source to be regulated, an output power circuit adapted to be coupled to a battery, an output control circuit including control means responsive to a control potential for regulating the output voltage of the electrical power source, voltage divider means coupled between said input circuit and the reference point, a transistor having input electrodes coupled to said voltage divider means and further having an output electrode coupled to said control means for applying a regulating signal thereto, said voltage divider means including means to provide changed conduction of said transistor with the output voltage above a predetermined value for control of said transistor and said control means, diode means series connected between said output power circuit and said input circuit and poled to prevent current flow from the battery to said regulator circuit, a circuit for supplying an alternating current potential and means for applying such alternating current potential to said diode means for rectification therein and charging of the battery.

5. A voltage regulator for a vehicular electromechanical source of direct current having a field winding and having output terminal means for supplying power to an electrical load of a vehicle including a storage battery, said regulator including in combination, first and second conductors for connection to the source of direct current, a field terminal for connection to the field winding, a transistor having an input electrode and further having output electrodes connected between one of said conductors and said field terminal to control current in the field winding, voltage sensitive switch means connected to said input electrode to control the conduction of said transistor, said voltage sensitive switch means including a voltage divider circuit connected across said first and second conductors and including a temperature responsive resistor, said resistor having a temperature response characteristic related to the charging requirement of the battery at different temperatures.

6. A voltage regulator for a vehicular electromechanical source of direct current having a field winding and having output terminal means for supplying power to an electrical load of a vehicle including a storage battery, said regulator including in combination, first and second conductors for connection to the source of direct current, a field terminal for connection to the field winding, a first transistor having a base and further having an emitter connected to said first conductor and a collector connected to said field terminal to control the current in the field winding, a second transistor having a base and further having an emitter connected to said first conductor and a collector connected to said base of said first transistor, a first resistor connected between said collector of said second transistor and said second conductor, a second resistor connected between said base and emitter of said second transistor, a voltage divider connected between said first and second conductors, a zener diode connected between said base of said second transistor and an intermediate point of said voltage divider, and a temperature sensitive resistor connected across a portion of said voltage divider, said temperature sensitive resistor having a temperature response characteristic related to the charging requirement of the battery at different temperatures.

7. A voltage regulator for an automotive electromechanical source of current having a field winding and adapted to charge an automotive storage battery, said regulator including in combination, a power circuit comprising a pair of conductors to be energized with direct current from the source and to be connected to the battery, a transistor having emitter, collector and base electrodes, means connecting said emitter electrode to a conductor of the power circuit, means for connecting said collector electrode to the field winding, a voltage responsive device with input and output terminals, a bias circuit for said base electrode including resistor means connected to said output terminal, means connecting said bias circuit to said power circuit and to said base electrode for reducing the conduction of said transistor to reduce the current in the field winding, a voltage divider connected across said conductors and having a point therein connected to said input terminal, said voltage divider including a temperature responsive resistor having a temperature response characteristic related to the charging requirements of the battery at different temperatures so that conduction of said transistor is reduced with the production of a higher voltage by the source at low temperatures than at high temperatures thereby charging the battery at a higher voltage at low temperatures than at high temperatures.

8. A voltage regulator system for an automotive electromechanical source of direct current having a field winding and adapted to charge an automotive storage battery, said regulator system including in combination, a power circuit comprising a first conductor and a reference conductor to be energized with direct current from the source, a diode series connected with said first conductor for connecting the same to the battery, said diode being poled to prevent conduction from the battery to said first conductor, a first transistor having emitter, collector and base electrodes, means for connecting said emitter and collector electrodes in series with the field and across said conductors so that said first transistor supplies the field current, a second transistor having input and output electrodes, a bias circuit for said base electrode including a circuit connected to said output electrode so that said second transistor controls the conduction of said first transistor for reducing the conduction of said first transistor to lower the current in the field winding, a voltage divider connected across said conductors and having a point therein connected to said input electrode, said voltage divider including a temperature responsive resistor having a temperature response characteristic related to the charging requirements of the battery at different temperatures so that conduction of said first transistor is reduced with the production of a higher voltage by the source at low temperatures than at high temperatures thereby charging the battery at a higher voltage at low temperatures than at high temperatures.

9. An automotive electric system including in combination, an electromechanical source of direct current having a field winding, a storage battery adapted to be charged by said source of direct current, an auto electrical circuit including an ignition switch connected to said storage battery for energization thereby, a power circuit comprising a reference conductor connected from said source of direct current to said battery and a further conductor including an isolation diode connected between said source of direct current and said battery, and a voltage regulator circuit connected between the reference conductor and the interconnection of said source of direct current with said diode, said regulator including a transistor connected to said field winding to be conductive therethrough and a voltage sensitive switch means connected to said transistor to control the conduction thereof, said voltage sensitive switch means including a voltage divider connected across said conductors and including a temperature responsive resistor having a response characteristic related to the charging requirements of said battery at different temperatures.

10. A current regulator circuit including in combination an input circuit adapted to be energized with respect to a reference point by an electrical power source to be regulated, an output power circuit adapted to be connected to utilization means to be supplied load current, an output control circuit including control means responsive to a control potential for regulating the output of the electrical power source, conductor means including resistor means for carrying load current connected between said input circuit and said output power circuit, voltage divider means coupled between said conductor means and the reference point and including temperature compensated means for maintaining substantially constant current therethrough upon variation of the voltage of the power source, a transistor having input electrodes connected to said voltage divider means and said resistor means and further having an output electrode connected to said control means, said temperature compensated means being selected to compensate for changes in transistor characteristics with change in overall temperature of said current regulator circuit, said resistor means providing a voltage for changing the conduction of said transistor at a given load current for regulation of said control means and application of the control potential to said output control circuit.

11. A voltage and current regulator circuit including in combination an input circuit adapted to be energized with respect to a reference point by an electrical power source to be regulated, an output power circuit adapted to be connected to utilization means to be supplied load current at a given output potential, an output control circuit adapted to be connected to means responsive to a control potential for regulating the output of the electrical power source, conductor means including resistor means for carrying load current connected between said input circuit and said output power circuit, a first transistor having output electrodes connected between said output control circuit and said output power circuit and further having an input electrode, voltage divider means coupled between said conductor means and the reference point and including means for maintaining substantially constant current therethrough as the voltage at said input circuit varies, a second transistor having input electrodes connected to said voltage divider means and said resistor means and further having an output electrode connected to the input electrode of said first transistor, said resistor means providing a voltage for changed conduction of said second transistor above a given load current for control of said first transistor and change of the potential at said output control circuit, a third transistor having input electrodes coupled to said voltage divider means and further having an output electrode coupled to said input electrode of said first transistor, said voltage divider means including means to cause changed conduction of said third transistor with the output voltage above the given output potential for control of said first transistor and change of the potential at said output control circuit.

12. A voltage and current regulator circuit including in combination an input circuit adapted to be energized with respect to a reference point by an electrical power source to be regulated, an output power circuit adapted to be connected to utilization means to be supplied load current at a given output potential, an output control circuit adapted to be connected to means responsive to a control potential for regulating the output of the electrical power source, conductor means including resistor means for carrying load current connected between said input circuit and said output power circuit, a first transistor having output electrodes connected between said output control circuit and said output power circuit and further having an input electrode, voltage divider means coupled between said conductor means and the reference point and including means for maintaining substantially constant current therethrough as the voltage at said input circuit varies, a second transistor having input electrodes connected to said voltage divider means and said resistor means and further having an output electrode connected to the input electrode of said first transistor, said resistor means providing a voltage to cause changed conduction of said second transistor above a given load current for control of said first transistor and change of the potential at said output control circuit, a third transistor having input electrodes coupled to said voltage divider means and further having an output electrode coupled to said input electrode of said first transistor, said voltage divider means including means to cause changed conduction of said third transistor with the output voltage above the given output potential for control of said first transistor and change of the potential at said output control circuit, and said voltage divider means further including temperature responsive means to cause such increased conduction of said third transistor at an output potential higher than the given output potential as the ambient temperature decreases.

13. A voltage and current regulator circuit including in combination an input circuit adapted to be energized with respect to a reference point by an electrical power source to be regulated, an output power circuit adapted to be connected to utilization means to be supplied load current at a given output potential, an output control circuit adapted to be connected to means responsive to a control potential for regulating the output of the electrical power source, conductor means including resistor means for carrying load current connected between said input circuit and said output power circuit, a first transistor having output electrodes connected between said output control circuit and said output power circuit and further having an input electrode, voltage divider means coupled between said conductor means and the reference point and including means for maintaining substantially constant current therethrough as the voltage at said input circuit varies, a second transistor having input electrodes connected to said voltage divider means and said resistor means and further having an output electrode connected to the input electrode of said first transistor, said resistor means providing a voltage to cause changed conduction of said second transistor above a given load current for control of said first transistor and change of the potential at said output control circuit, said voltage divider means also having temperature responsive resistor means for establishing a bias on said second transistor which changes with temperature to compensate for conduction characteristic changes in said second transistor, a third transistor having input electrodes coupled to said voltage divider means and further having an output electrode coupled to said input electrode of said first transistor, said voltage divider means including means to cause changed conduction of said third transistor with the output voltage above the given output potential for control of said first transistor and change of the potential at said output control circuit.

14. A regulator circuit for limiting the voltage and current of a vehicular generator system including control means responsive to a regulating potential for controlling the output of the generator system and output means for supplying charging current to a storage battery, said regulator circuit including in combination, conductor means for interconnecting the output means of the generator system and the battery to supply output current at a potential with respect to a reference point, a first transistor having output electrodes coupled to the conductor means and adapted to be connected to the control means and having an input electrode, said conductor means including resistor means for carrying load current and means to prevent conduction from the battery into said regulator circuit, voltage divider means coupled between said conductor means and the reference point and including means for maintaining substantially constant current therethrough as the voltage at the output means of the generator system varies, a second transistor having input electrodes connected to said voltage divider means and said resistor means and further having an output electrode connected to the input electrode of said first transistor, said resistor means providing a voltage to cause changed conduction of said second transistor above a given charging current for control of said first transistor and change of the potential at said output electrode of said first transistor, a third transistor having input electrodes coupled to said voltage divider means and further having an output electrode coupled to said input electrode of said first transistor, said voltage divider means including means to cause changed conduction of said first transistor with the voltage output at the output means of the generator system above a given value for control of said first transistor and change of the potential at said output electrode thereof.

15. A regulator circuit for limiting the voltage and current of a vehicular generator system including control means responsive to a regulating potential for controlling the output of the generator system and output means for supplying charging current to a storage battery, said regulator circuit including in combination, conductor means for interconnecting the output means of the generator system and the battery to supply output current at a potential with respect to a reference point, a first transistor having output electrodes coupled to said conductor means and adapted to be connected to the control means and having an input electrode, said conductor means including resistor means for carrying load current and diode means to prevent conduction from the battery into said regulator circuit, voltage divider means coupled between said conductor means and the reference point and including means for maintaining substantially constant current therethrough as the voltage at the output means of the generator system varies, a second transistor having input electrodes connected to said voltage divider means and said resistor means and further having an output electrode connected to the input electrode of said first transistor, said resistor means providing a voltage to cause changed conduction of said second transistor at a given charging current for control of said first transistor and change of the potential at said output electrode of said first transistor, a third transistor having input electrodes coupled to said voltage divider means and further having an output electrode coupled to said input electrode of said first transistor, said voltage divider means including means to cause changed conduction of said first transistor with the voltage output at the output means of the generator system above a given value for control of said first transistor and change of the potential at said output electrode thereof, and circuit means for supplying alternating current to said diode means for rectification thereof and charging of the storage battery.

16. A regulator circuit for limiting the voltage and current of a vehicular generator system including a control winding responsive to a regulating current therethrough for controlling the output of the generator system and output means for supplying charging current to a storage battery, said regulator circuit including in combination, conductor means for interconnecting the output means of the generator system and the battery to supply output current at a potential with respect to a reference point, a first transistor having input electrodes coupled between said conductor means and the reference point and an output electrode adapted to be connected in series with the control winding to supply regulating current thereto, said conductor means including a first resistor for carrying output current and a diode poled to prevent conduction from the battery into said regulator circuit, voltage divider means coupled between said conductor means and the reference point, said voltage divider means including a first portion having a second resistor coupled to said first resistor and a ballast tube for maintaining substantially constant current through said second resistor as the voltage output at the output means of the generator system varies, a second transistor having input electrodes connected to said first and second resistors and further having an output electrode connected to an input electrode of said first transistor, the values of said first and second resistors being selected to permit increased conduction of said second transistor above a given output current for regulation of said first transistor and reduction of the regulating current in the control winding, said voltage divider means further having a second portion including a series connected zener diode and a third resistor, a third transistor having input electrodes coupled across said third resistor and further having an output electrode coupled to an input electrode of said first transistor, the constants of said voltage divider means including the second portion thereof being selected to cause increased conduction of said third transistor with the voltage of the generator system above a predetermined value for a regulation of said first transistor and reduction of the regulating current in the control winding.

17. A regulator circuit for limiting the voltage and current of a vehicular generator system including a control winding responsive to a regulating current therethrough for controlling the output of the generator system and output means for supplying charging current to a storage battery, said regulator circuit including in combination, conductor means for interconnecting the output means of the generator system and the battery to supply output current at a potential with respect to a reference point, said conductor means including a first resistor for carrying output current and switch means and a diode poled to prevent conduction from the battery into said regulator circuit, a first transistor having output electrodes adapted to be connected in series with the control winding and said conductor means to supply regulating current thereto and further having an input electrode, voltage divider means coupled between said conductor means and the reference point, said voltage divider means including means for maintaining substantially constant current therethrough as the voltage output at the output means of the generator system varies, a second transistor having input electrodes connected to said voltage divider means and further having an output electrode connected to the input electrode of said first transistor, said voltage divider means including means for causing increased conduction of said second transistor above a given output current for regulation of said first transistor and reduction of the regulating current in the control winding, a third transistor having input electrodes coupled to said voltage divider means and further having an output electrode coupled to an input electrode of said first transistor, said voltage divider means including means to cause increased conduction of said third transistor with the voltage of the generator system above a predetermined value for a regulation of said first transistor and reduction of the regulating current in the control winding, and transformer means adapted to be energized by an alternating current source, said switch means having contacts to couple said transformer means through said diode to the battery for charging the same.

18. A voltage and current regulator circuit including in combination an input circuit adapted to be energized with respect to a reference point by an electrical power source to be regulated, an output circuit adapted to be connected to utilization means to be supplied load current at a given output potential, an output control circuit adapted to be connected to means responsive to a control potential for regulating the output of the electrical power source, conductor means including a first resistor for carrying load current connected between said input circuit and said output power circuit, a first transistor having output electrodes connected to said power circuit and to said output control circuit and further having an input electrode, voltage divider means coupled between said conductor means and the reference point, said voltage divider means including a first portion having a second resistor coupled to said first resistor and a ballast tube for maintaining substantially constant current through said second resistor as the voltage at said input circuit varies, a second transistor having input electrodes connected to said first and second resistors and further having an output electrode connected to the input electrode of said first transistor, the values of said first and second resistors being selected to permit increased conduction of said second transistor above a given load current for control of said first transistor and reduction of the potential at said output control circuit, said voltage divider means further having a second portion including a series connected zener diode and a third resistor, a third transistor having input electrodes coupled across said third resistor and further having an output electrode coupled to said input electrode of said first transistor, the constants of said voltage divider means including the second portion thereof being selected to permit increased conduction of said third transistor with the output voltage above a predetermined value for control of said first transistor and reduction of the potential at said output control circuit.

19. A voltage regulator circuit including in combination an input circuit adapted to be energized with respect to a reference point by an electrical power source to be regulated, an output control circuit adapted to be connected to means responsive to a control potential for regulating the output voltage of the electrical power source, a first transistor having output electrodes connected to said input circuit and to said output control circuit and further having an input electrode, voltage divider means coupled between said input circuit and the reference point, said voltage divider means having a series connected zener diode and a resistor, and a second transistor having input electrodes coupled to said zener diode and said voltage divider means and further having an output electrode coupled to said input electrode of said first transistor, the constants of said voltage divider means being selected to permit increased conduction of said second transistor with the output voltage above a predetermined value for control of said first transistor and reduction of the potential at said output control circuit, said voltage divider means also including a temperature responsive resistor for causing such increased conduction of said second transistor to occur at output voltages changing with temperature.

20. A voltage and current regulator circuit for a generator system including a control winding responsive to a regulating current therethrough for controlling the output of the generator system and output means for supplying direct current to a load, said regulator circuit including in combination, conductor means for interconnecting the output means of the generator system and the load to supply load current at a potential with respect to a reference point, a control transistor having input electrodes coupled to said conductor means and the reference point and an output electrode adapted to be connected in series with the control winding to supply regulating current thereto, said conductor means including a first resistor for carrying load current, voltage divider means coupled between said conductor means and the reference point, said voltage divider means including a first portion having a second resistor coupled to said first resistor and a ballast tube for maintaining substantially constant current through said second resistor as the voltage output at the output means of the generator system varies, a current regulating transistor having input electrodes connected to said first and second resistors and further having an output electrode connected to an input electrode of said control transistor, the values of said first and second resistors being selected to bias said current regulating transistor to a cutoff condition below a given load current and to permit conduction of said current regulating transistor above the given load current for regulation of said control transistor and reduction of the regulating current in the control winding, said voltage divider means further having a second portion including a series connected zener diode and a third resistor, a voltage regulating transistor having input electrodes coupled across said third resistor and further having an output electrode coupled to an input electrode of said control transistor, the constants of said voltage divider means including the second portion thereof being selected to bias said voltage regulating transistor to a cutoff condition with a voltage of the generator system below a predetermined value and to permit conduction of said voltage regulating transistor with such voltage above the predetermined value for regulation of said control transistor and reduction of the regulating current in the control winding.

No references cited.